United States Patent [19]

Michael et al.

[11] 4,240,113

[45] Dec. 16, 1980

[54] PICTURE MANIPULATION IN VIDEO SYSTEMS

[75] Inventors: Peter C. Michael, Newbury; Richard J. Taylor, London; Martin R. Trump, Newbury, all of England

[73] Assignee: Micro Consultants, Limited, Berkshire, England

[21] Appl. No.: 15,676

[22] Filed: Feb. 27, 1979

Related U.S. Application Data

[63] Continuation-in-part of Ser. No. 841,519, Oct. 12, 1977, Pat. No. 4,163,249.

[30] Foreign Application Priority Data

Oct. 14, 1976 [GB] United Kingdom ............... 42751/76
Jul. 26, 1977 [GB] United Kingdom ............... 31355/77
Jul. 26, 1977 [GB] United Kingdom ............... 31356/77
Sep. 14, 1978 [GB] United Kingdom ............... 36839/78

[51] Int. Cl.³ ............................................. H04N 3/22
[52] U.S. Cl. .................................. 358/180; 358/105; 358/138
[58] Field of Search ........................ 358/180, 105, 138

[56] References Cited

U.S. PATENT DOCUMENTS 2,921,124  1/1960  Graham ............................... 358/138

Primary Examiner—Richard Murray
Attorney, Agent, or Firm—Dowell & Dowell

[57] ABSTRACT

A video system and method for manipulating picture information in the form of a number of picture points. The information is manipulated by sequentially synthesizing a picture point from information on a number of existing picture points adjacent the synthesized picture point from at least one field. The portions of the picture points used from current and previous fields may be varied in dependence on picture movement detected between fields.

27 Claims, 12 Drawing Figures

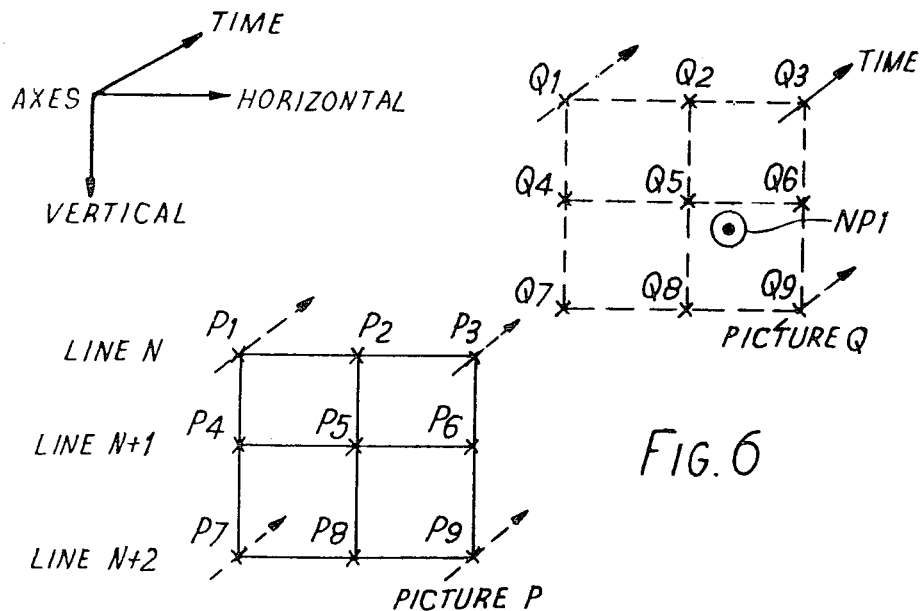
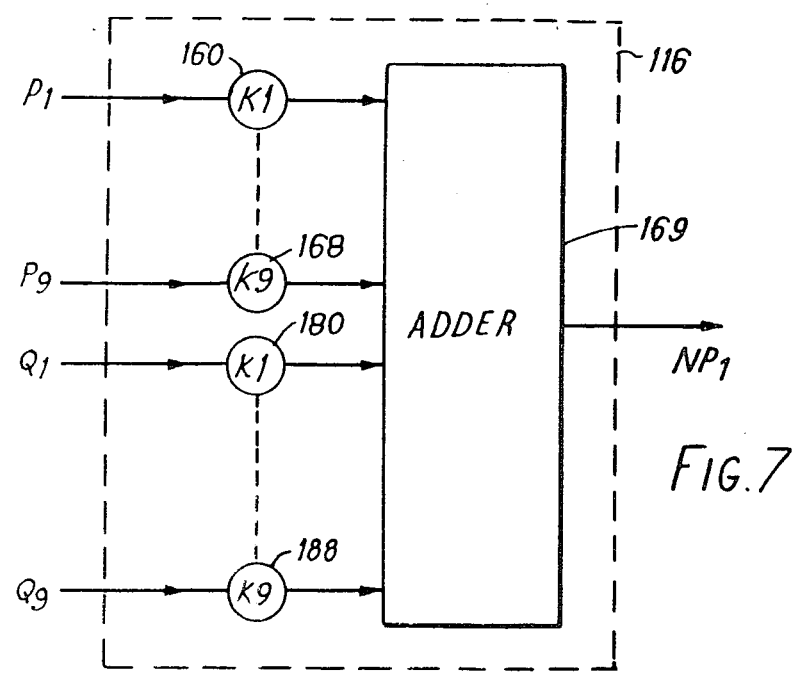
Fig. 6
Fig. 7

PICTURE MANIPULATION IN VIDEO SYSTEMS

This is a continuation-in-part application to Ser. No. 841,519 filed Oct. 12, 1977, now U.S. Pat. No. 4,132,249.

BACKGROUND OF THE INVENTION

The invention relates to the manipulation of video picture data to provide modification of some aspect of the picture content and more particularly to the generation of new picture point information from information on existing picture points to provide a modified picture.

SUMMARY OF THE INVENTION

According to the invention there is provided a video system for manipulating picture information in the form of a plurality of picture points comprising means for synthesising a picture point from information on a number of existing picture points adjacent said synthesised picture point from at least one field.

Further according to the invention there is provided a method of manipulating picture information in the form of a plurality of picture points comprising synthesising a new picture point from information on a number of existing picture points adjacent the synthesised point from at least one field.

BRIEF DESCRIPTION OF DRAWINGS

The invention will now be described by way of example with reference to the accompanying drawings in which:

FIG. 6 shows the volume processing function for the input and output processors;

FIG. 7 shows the construction of a volume processor;

DESCRIPTION OF PREFERRED EMBODIMENTS

Figure 1:
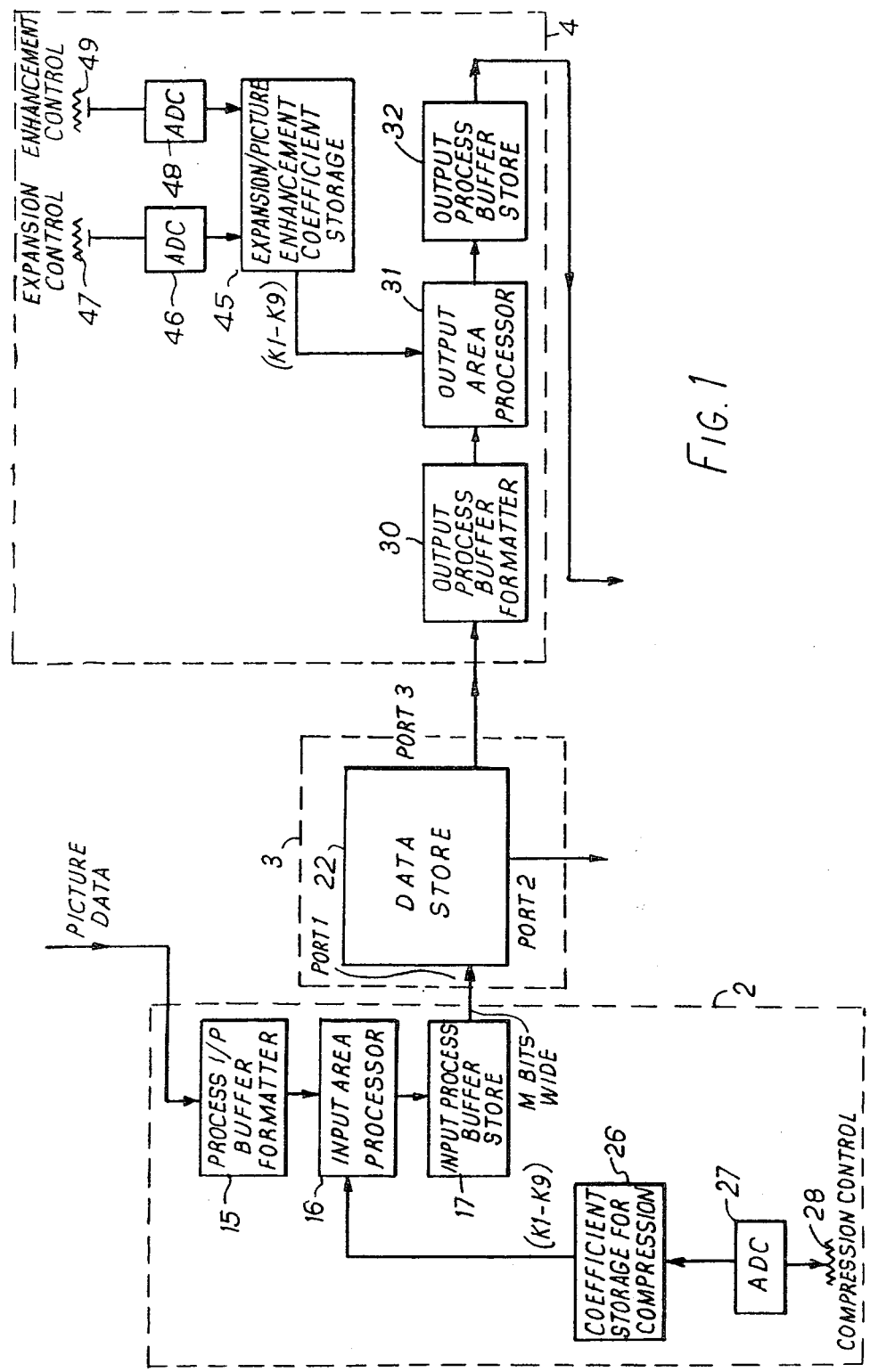
FIG. 1 shows a processing system incorporating area processing.

FIG. 1 shows part of a processing system disclosed in British patent application No. 42751/76 which system includes picture compression/expansion, noise reduction and standards conversion. The part of the system shown in FIG. 1 is concerned mainly with processing the incoming data prior to and after storage. The processor unit 2 is shown in this example as effecting picture compression. The input to unit 2 is a digital T.V. signal. Thus if the signal is normal composite video, the chrominance and luminance components will have been separated and the analogue information converted into digital form for application to the unit 2. Such analogue to digital conversion of T.V. signals is well known. For compression, the unit 2 will take the digital data corresponding to incoming picture point information and derive a reduced number of picture points for a given picture size so that the reduced size picture from the system output will be produced in real time derived from the incoming data. In the case of expansion, unit 2 would modify the incoming picture information so as to derive a larger number of picture points than originally present for a given picture size so that at the system output an expanded picture based on the original data will be produced in real time.

The modified data from unit 2 will be temporarily stored in digital store 3 prior to read out (e.g. for 1 frame period). An example of such a store is disclosed in British patent application No. 6585/76. A compression/expansion unit 4 may also be provided at the output of store 3 as shown. Thus the unit 2 could conveniently be used for compression and unit 4 for expansion. The amount of compression or expansion can be variable if required so that the zoom down or zoom up can be provided in real time.

The output from unit 4 may be reconverted into analogue form as required and the known additional processing functions effected to provide an analogue composite T.V. signal output. The data in store 3 is accessible at port 2 to allow additional modification of the data, for example noise reduction, as described in British patent application No. 42751/76 referred to above.

The processor unit will now be described more fully.

The digital data (e.g. 8 bit wide) is applied to a process input formatter 15 within unit 2 which formatter accepts the digital data stream in the order presented, stores it and represents it so that the input area processor 16 may operate on the signal.

The input processor 16 is an area processing operation which accepts a number of picture points from adjacent lines horizontally and adjacent points vertically. A co-efficient (described in detail below) is applied to each of the input points and the resultant output is a single data word for each new picture point which is the sum of various proportions of the input data points over the area being processed. The required compression coefficients are stored in a coefficient store 26 and the degree of compression can be controlled by compression control 28 via ADC 27.

The input processor buffer store 17 accepts data from the input processor 16 at the rate presented and re-formats it for subsequent storage in the main store 3.

Port 3 from the digital data store 22 produces data and applies it to the output processor buffer formatter 30 of unit 4. The formatter 30 accepts the output from port 3 and modifies it for processing in the output processor unit 31. This modification is a simple rearrangement of the data necessary for use in the output processor.

The output processor 31 operates as an area processing function in a similar way to the input processor. The output processor accepts data from a number of adjacent lines horizontally and a number of adjacent picture points vertically. Each of the picture points are modified by a co-efficient described below and the resultant output data is available for application to the output processor buffer store 32.

The coefficients for expansion are stored in store 45, and the degree of expansion can be controlled by control 47 via ADC 46. Enhancement can also be provided by control 49 via ADC 48 and is described in more detail below.

The output process buffer store 32 takes the information from the output processor function and modifies it for application to a digital to analogue converter (not shown) as required. The modification is a simple rearrangement and re-timing of the output information such that it appears in the time scale necessary for handling by the digital to analogue converter (DAC).

Although the units 2 and 4 of FIG. 1 are described as relating to compression and expansion/enhancement this is to illustrate typical functions. More basically the invention is concerned with synthesis of a picture point from a number of adjacent picture points under the control of a number of coefficients which can be manipulated digitally (in this example this manipulation is shown by control 28 and ADC 27). Only one unit need be considered in detail as these operations are similar.

The processor input buffer formatter 15 accepts the data as presented (by the ADC) and re-formats it for application to the input processor. It is simply a buffer store operating at approximately 15 MHz (e.g. 1 line stores of 1024 locations).

Figure 2:
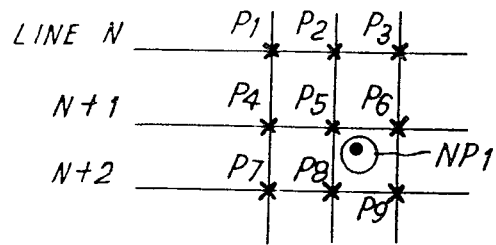
FIG. 2 shows the generation of a new picture point from surrounding picture points in a small area.

The input processor 16 operates in the area processing mode. FIG. 2 shows the function of the input area processor. Successive picture points P1 to P9 on adjacent lines N, N+1 and N+2 are applied to the input processor. Each of the points P1 through P9 is modified by coefficient K1 through K9. The resultant sum is a new picture point designated NP1 where $$NP1 = K1P1 + K2P2 + K3P3 \ldots \text{etc through } K9P9$$

If the input area processor function is operating to reduce the picture size for compressed pictures the output data may appear more slowly than the input data. Thus for compression, the number of new picture points produced will be less than the original number of picture points but each new picture point will be derived from data on the nearest 9 picture points. How the processor effects this function will now be described.

In order to reduce the size of a standard television picture, interpolation is needed across the picture area. In the system described the total television picture is broken up into a number of picture points. The picture could typically be broken into 512 picture points per line for a 525 line picture. As already described with reference to FIG. 2, the area process function is effected for new picture point NP1 by the expression $$NP1 = K1\ P1 + K2\ P2 + \ldots K9\ P9.$$

Figure 3:
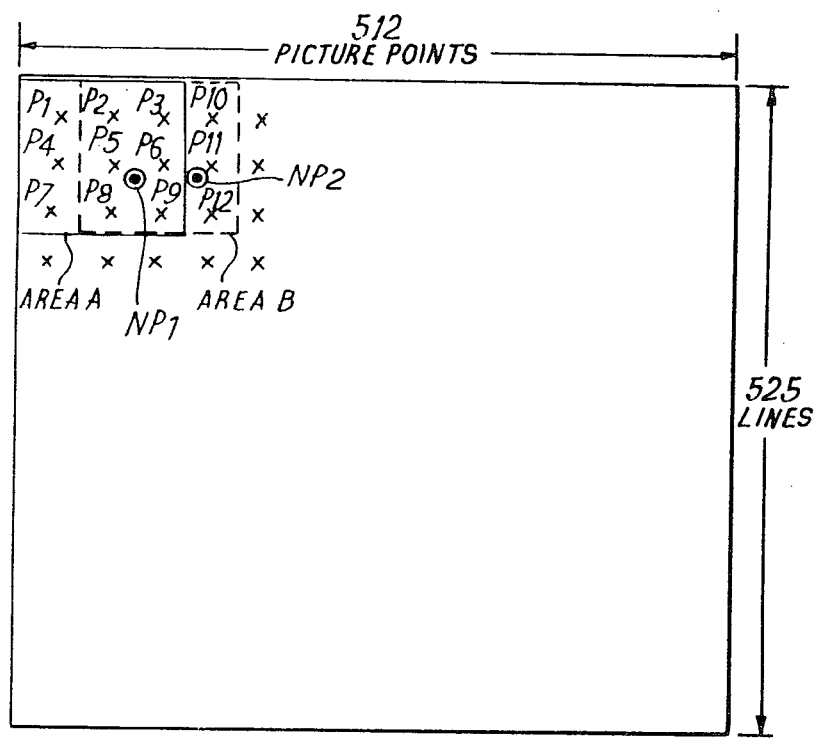
FIG. 3 shows the processed areas in relation to a normal T.V. picture.

This area is designated Area A in FIG. 3. When calculating the next picture point NP2 (say) the values of coefficients K1 to K9 for Area B will be different to those for Area A thus $$NP1 = K1A\ P1 + K2A\ P2 + K3A\ P3 + \ldots K9A\ P9 \text{ and}$$

$$NP2 = K1B\ P2 + K2B\ P3 + K3B\ P10 + \ldots K9B\ P12.$$

Thus the input area process remains the same but the coefficients K1 through K9 are variable.

The operation of area interpolation occurs in real time and as the data represents incoming information scanned horizontally the coefficients K1 through K9 have to change across the length of 1 television line. In the system described the switch occurs between picture points.

In the same way vertically the boundaries between the lines represent coefficient changes. Each new picture point is computed from information available from the nearest 9 picture points to that new picture point.

In order to switch coefficients between the picture point boundaries horizontally excess look-up tables are provided within the basic system. However as it is possible to re-load data into the look-up tables when they are not in use it is possible to implement the system utilising only one complete set of excess look-up tables.

The coefficients K1 through K9 are stored in a separate coefficient storage unit 26. The required degree of compression is manually controlled by the analogue type control 28. The amount of compression is converted into a digital number in analogue to digital converter 27 and applied to the coefficient store so that the required values of K1 through K9 are extracted for each setting of the compression control.

Figure 4:
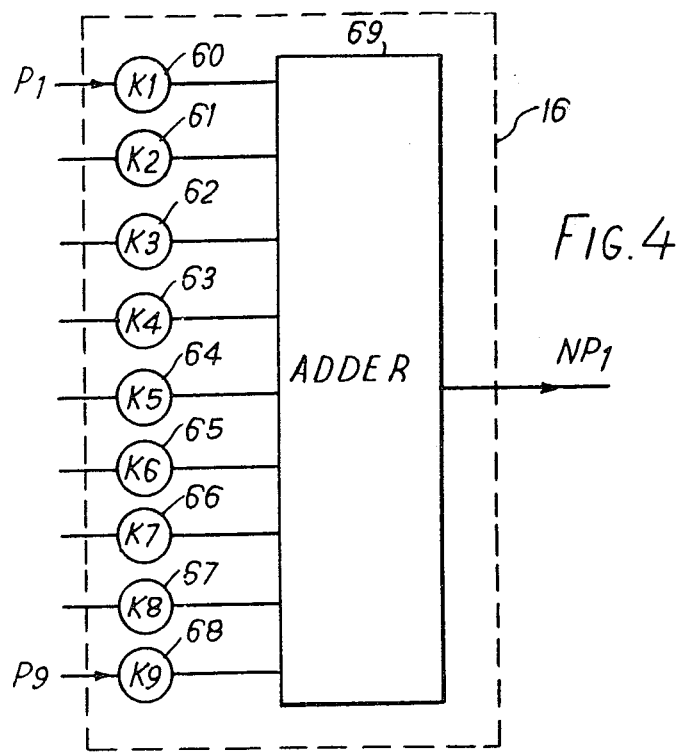
FIG. 4 shows the construction of an area processor including several multipliers.

The area processor 16 is shown in detail in FIG. 4. Multipliers 60–68 each receive data on one picture point (P1–P9) and multiply the data by coefficients K1 to K9 respectively, which coefficients will each be variable but preset. The modified data is added in adder 69 which comprises a 9 input×8 bit adder. The output from adder 69 will be the new picture point NP1.

Figure 5:
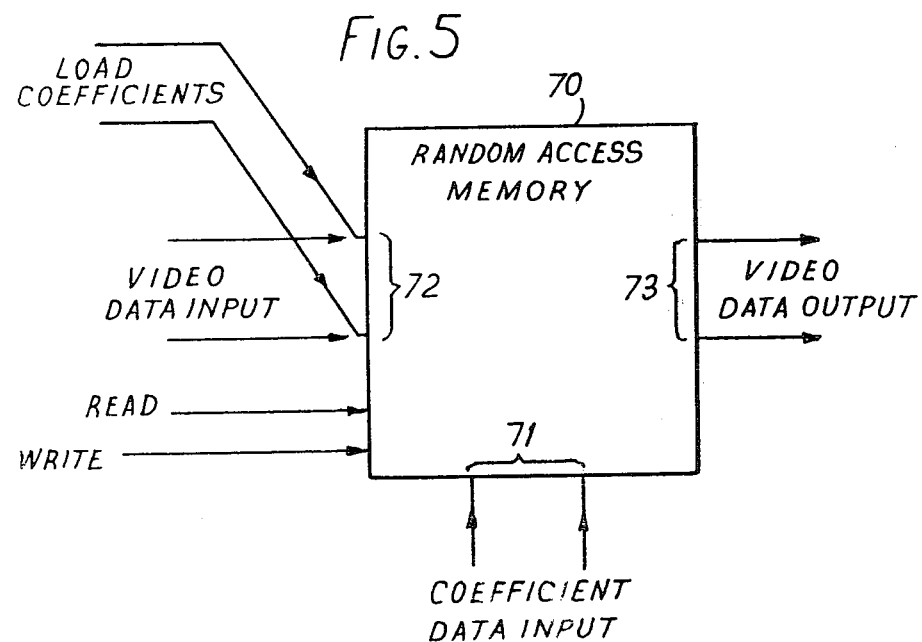
FIG. 5 shows a random access memory used for the multipliers of FIG. 4.

The coefficient multiplier function of area processor 16 (i.e. multipliers 60–68) can be effected by using random access memories (RAM), see FIG. 5. The RAM 70 shown is of 8×256 bit capacity and such memories and their mode of operation are well known in digital processing. The coefficients K1 to K9 are loaded into the store locations within the RAM during a write cycle. The coefficient data from the coefficient store 26 (of FIG. 1) is applied to the RAM data input 71 shown in FIG. 5. The location to which data is written in is determined by store address data input 72. Address data is applied in the normal way to the address input 72 to input the coefficient data at input 71. The addressing data is shown as 'load coefficients'. During operation as a multiplier (i.e. read cycle) the incoming video data is applied to the RAM 'address' terminals 72. The RAM has sufficient addresses so that each input number identifies one particular location within the store. Thus as each location has a preloaded coefficient stored therein when a particular location is accessed (i.e. in dependance on the incoming data which effectively defines the address), the data stored in a particular location is read out from the RAM at output 73. This data will either be an 0 or I depending on the predetermined coefficient. Thus the 8 bit input data for picture point P1 will effectively be multiplied by a coefficient K1.

The input processor buffer store 17 accepts the data produced by the input area processor 16 and stores it ready for input to the data store. It is simply a buffer store operating at a maximum of 15 MHz and a figure which may be lower in the case of compressed pictures.

The data store has three data ports 1, 2 and 3. Port 1 allows data to be written into the store, port 2 allows data to be read from the store at a location corresponding to port 1 and port 3 allows data to be read from the store at another location. In principle the three ports run asynchronously.

The store 3 will have an associated store control which includes address counters for addressing the various memory addresses within the frame store for a read or write cycle and timing control for producing timing signals for addressing the memory elements at the correct point in time, in known manner and as explained in detail in the above referenced patent application No. 6585/76. The store itself may be constructed from known 64×64 bit memory chips (i.e. 4096 by 1 bit RAM) which bit locations are accessed by entering row and column address information from the store control as an 18 bit address derived from picture point counters. As the 4096 random access memory chip is dynamic, a refresh cycle must also be effected to retain the stored data. Refresh address counters are therefore included. For example, a store using 16 cards each containing 32 RAM chips would provide a framestore of 256×512 words 8 bits wide to allow 512 video lines each of 512 picture points to be stored. The storage capacity provided may extend to several frames.

The output area processor 31 is similar in concept to the input area processor accepting inputs from adjacent lines and adjacent points. Coefficients are applied using the look-up system and the resultant output information is stored in the output processor buffer store 32.

The output processing system allows the image to be enlarged. Information from the part of the store being accessed is read into the output process buffer 30 and processed using coefficients for K1 through K9 stored in the coefficient storage for expansion unit 45. The amount of expansion required is controlled by the expansion control 47. The analogue to digital converter 46 enables the values for K1 through K9 on the output area processor to be withdrawn from the coefficient store 45. The implementation of the output area processor is similar in every respect to the input area processor. In principle the output area processor may be used for compressed pictures as well as enlarged pictures. The only difference is in the values of the coefficients required.

In addition to the basic expansion function, picture enhancement can be effected as shown. Picture enhancement is generally concerned with improvements in edge effects. In the television system this is called horizontal and vertical aperture correction. The output area processor enables both horizontal and vertical aperture correction to be undertaken by selecting appropriate coefficients for K1 through K9. Enhancement control 49 is connected to the store 45 via ADC 48 and operates in similar manner to the expansion control.

The area processed digital data is passed to the output process buffer store 32 which buffer applies this digital data to a digital to analogue converter (not shown) which converts the digital number to an analogue representation. The DAC may be of the form described in British patent application No. 25721/73 (U.S. Pat. No. 472,059).

In the system which has been described 3 horizontal lines and 3 adjacent vertical points are processed as an area. There is no reason why a larger number of points cannot be used for very large magnifications and very large enhancements.

Similarly if only a small range of compression, enlargement and enhancement is required less than 9 points may be processed as an area.

The system has been described so far in terms of picture manipulation for pure compression about a central point and expansion about a central point. It is clear however that compression about any point or axis in the system may be undertaken by altering the coefficients in the input area processor and output area processor. If for example the coefficients are calculated in the normal way across the picture that is to say, coefficients for the first picture point are different from those for the second picture point and different from the third, etc but that vertically all coefficients remain the same then compression occurs about the centre line of the picture rather than the central point. This effect is called 'horizontal squeezing'.

In the system just described with relation to FIG. 1, the generation of a new picture point is effected by taking into account information from the surrounding picture points (i.e. area manipulation).

The basic requirement is the synthesis of a picture point which did not exist as a picture point on the incoming video data. The engineer aims at producing the best estimate of the likely value of a picture point by examining picture points around the synthesised picture point and either adding or subtracting various proportions of them to produce the best result.

Theoretical studies give a good guide to the values which might be chosen but in practice subjective viewing of the results has proved to be the only satisfactory way of generating a design. An improvement in the basic system of FIG. 1 has been achieved by using volume manipulation for some applications. Volume manipulation has been found to produce a better subjective result than area manipulation by itself. Volume manipulation adds another dimension to the matrix of picture points which may be used. Area manipulation used only horizontal and vertical dimensions. Volume manipulation uses horizontal, vertical and time dimensions. The synthesis of a new picture point using volume manipulation makes use not only of the adjacent picture points in the horizontal and vertical dimension of one picture but also of information coming from the next picture or series of pictures.

FIG. 6 shows a 3×3×2 volume manipulation maxtrix. In each of two successive fields (successive pictures P and Q) nine picture points P1 to P9 and Q1 to Q9 are defined. These 18 points are those closest to the new picture point NP1 to be synthesised together with picture points some little distance away. Thus P1 to P9 are the original picture points on picture P and Q to Q9 are the picture points on picture Q.

The new picture point is calculated from the expression below $$NP1 = K1P1 + K2P2 + K3P3 + K4P4 + K5P5 + K6P6 + K7P7 + K8P8 + K9P9 + k1Q1 + k2Q2 + k3Q3 + k4Q4 + k5Q5 + k6Q6 = k7Q7 + k8Q8 + k9Q9.$$

The way in which the addition and multiplication is effected has been described with reference to FIGS. 4 and 5. The FIG. 4 arrangement would be expanded to handle the additional coefficients and picture points.

A circuit which could be used to implement the solution for NP1 is 18 separate real time multipliers feeding into an 18 input adder. Such an arrangement is shown in FIG. 7. Volume processor 116 comprises multipliers 160 to 168 for the picture points P1 to P9 and multipliers 180 to 188 for picture points Q1 to Q9. The multiplier outputs are connected to adder 169. Serial operation of some multipliers and adders may be utilised or a combination of serial-parallel adding and multiplication may be used. As already described the volume manipulation can be used to enlarge or reduce the size of the television picture. Utilisation of this principle produces imperceptible picture degradation over a very large picture size change. The principle has also been used to produce a digital standards converter capable of changing the picture size from 525 to 625 line standards or 625 to 525 line standards as described in British patent application No. 31996/77. The principle has been used to produce a production tool for television producers capable of extending the picture from normal television raster size to the equivalent of a magnification between 3 and 10 times real size. The same piece of equipment is capable of reducing the picture size from normal raster size to effectively zero size.

The volume manipulation principle described above produces imperceptible degradation if the scene being viewed remains stationary or near so. Moving scenes can cause errors in the solution to the synthesised picture point. A technique for preventing degradation is to utilise 'adaptive' volume manipulation.

Simple volume manipulation utilises approximately the same amount of information from both picture P and picture Q. The percentage utilised from each picture varies over the screen and depends upon the magnification or size reduction operating at any time. K1 to K9 and k1 to k9 are caused to vary depending upon the magnification or size reduction demanded. This mode of operation is generally similar to the area manipulation of FIG. 1 except that picture points from picture Q are included.

'Adaptive' volume manipulation reduces the proportion of picture P utilised to generate the synthesised picture point in P1. K1 to K9 are reduced to a low value and k1 to k9 are increased in value under conditions when picture degradation would be caused (i.e. a greater proportion of picture Q is used).

Volume manipulation minimises the picture degradation by giving the processor access to incoming picture points which are as close as possible to the synthesised picture point being generated. The principle potential for degradation occurs when a scene changes between picture P and picture Q. Such a change may be caused by movement and generally all changes are ascribed to this cause whenever their actual source—for example noise on the signal will give a signal change which can be mistaken for picture movement. To determine that movement is occurring a movement detector is incorporated in the system.

Movement detection may be determined by measuring the change which has occurred between one successive picture point and the next. A threshold level is ascribed to the difference between the two levels and movement is determined to have taken place when the threshold is exceeded in either direction.

Figure 8:
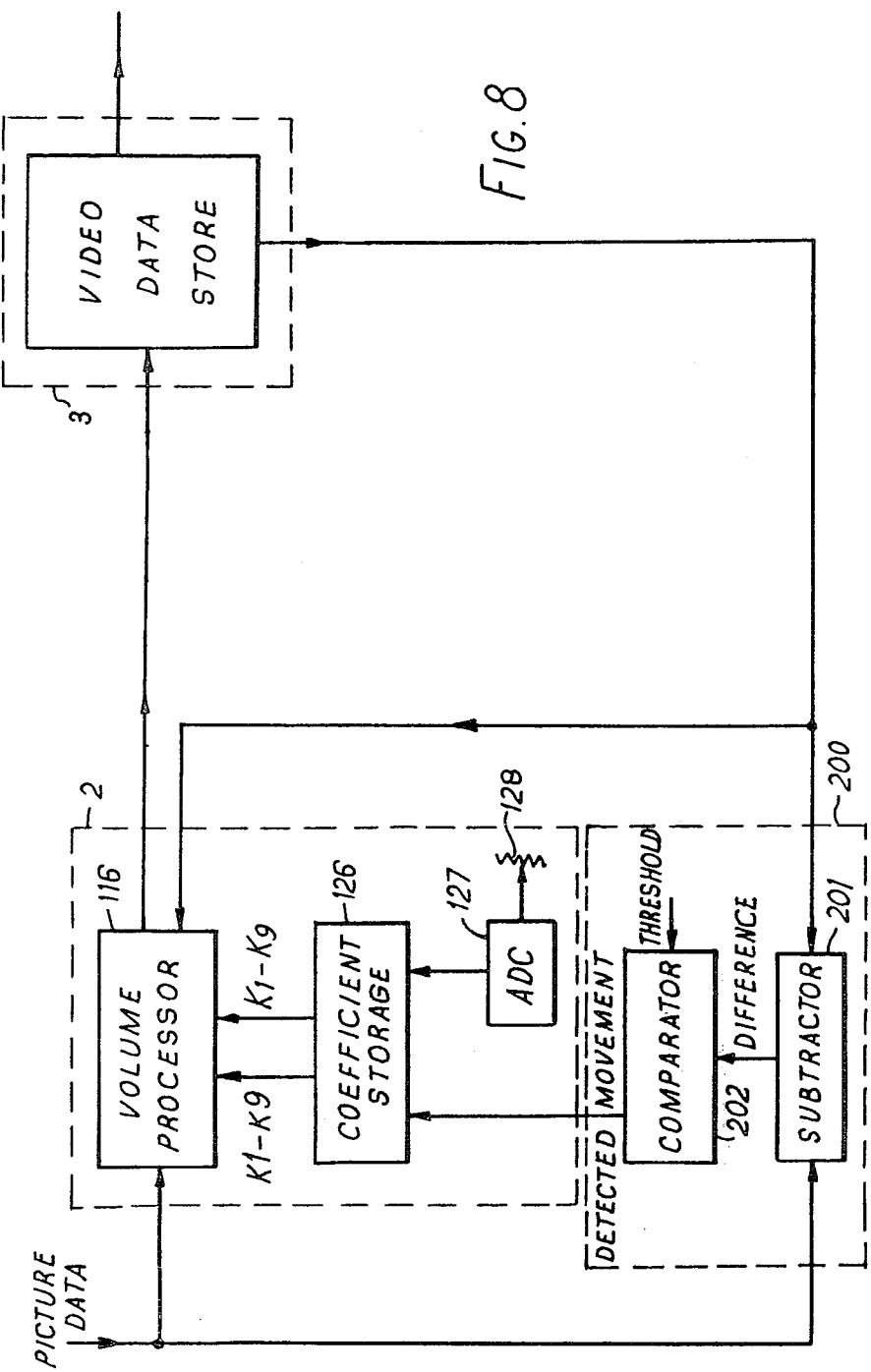
FIG. 8 shows the volume processor together with a movement detector.

The adaptive volume processor system is given access to the movement detector and utilises the information to change the coefficients of K1 to K9 and k1 to k9 as described above. Thus when movement is detected, the coefficients applied to the previous field data fed back from the store are typically set to zero so that the volume processor operates in the area mode only. FIG. 8 shows an arrangement which includes volume processing and movement detection. New data is input to one input of the substractor 201 to movement detector 200 and data from store 3 applied to the other input of subtractor 201. The difference signal is input to comparator 202 where it is compared with the threshold and when movement is detected the signal passes to coefficient store 126 so that different values for the coefficients are selected. The picture compression for volume processor 116 is effected by control 128 via ADC 127 as before. The processor output passes to the store as before via the noise reduction system 6. (Input and output buffering have been omitted for the sake of clarity.)

The description above of adaptive volume manipulation has used 9 picture points in two successive pictures to provide a synthesis of the new picture point. Experiments have been made with various values for the number of picture points to be used and their allocation. A particular case exists when only a single line of information is used in picture P and two lines of information are used in picture Q. Such a special case of volume manipulation has been used with a consequent reduction of the circuitry needed for implementation. In this case the vertical component of NP1 is given by the equation.

$$(\text{Vert})NP1 = k1Q1 + k4Q4 + K1P1$$

Figure 9:
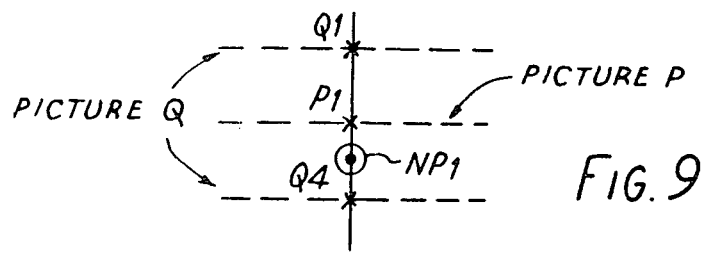
FIG. 9 shows an alternative volume processing function.

Values of k1, k4 and K1 are varied according to the picture size required and under the control of the movement detector. FIG. 9 shows only the computation of the vertical component of NP1.

Horizontal interpolation may be undertaken using real time multipliers. Another method of undertaking horizontal interpolation is to vary the clock frequency of the input and output to a store. In a simple example a line may be clocked into a line store at one speed and clocked out of the same store at a different speed. The effect is a horizontal expansion or contraction depending upon the relative speeds of the input and output clocks.

Figure 10:
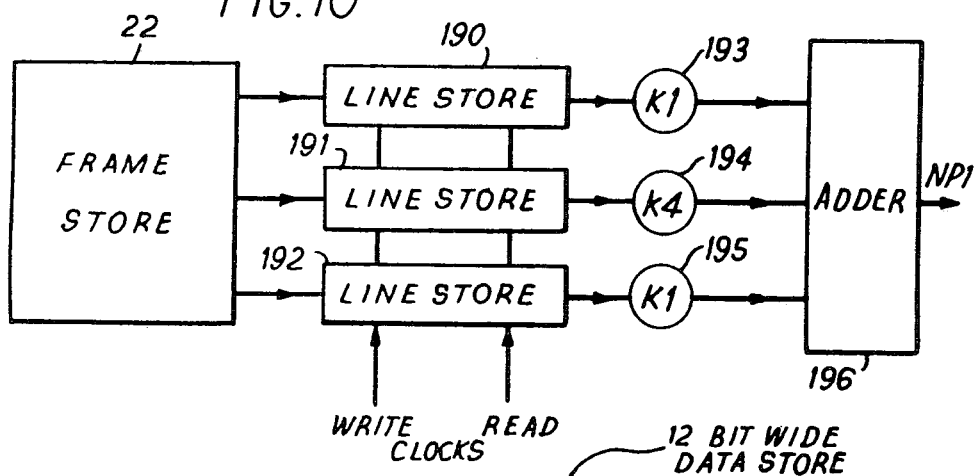
FIG. 10 shows an arrangement for horizontal expansion and contraction using variable write-read clock pulse frequencies.

The principle has been utilised in conjunction with the special case of volume manipulation described above to provide a specific range of expansion and contraction. FIG. 10 shows an arrangement for horizontal expansion or contraction using variable write/read clock frequencies. Picture data from frame store 22 is input to line stores 190, 191 and 192 at one input clock rate and read out at a different speed to multipliers 193, 194, 195 for coefficients k1, k4 and K1 respectively. The multiplier outputs are connected to adder 196 to produce NP1. The combination of these two special cases shown in FIG. 9 and FIG. 10 reduces the requirements for circuit complexity considerably.

In the system just described with reference to FIG. 9 using adaptive volume manipulation at the input to the store, movement information is available to provide the adaptive control without any difficulty. The movement detector operates by comparing new incoming signal information with previously stored signal information. A threshold is determined and movement is identified when the threshold is exceeded in either direction.

In a system which utilises volume manipulation at any other point other than the input to the store the movement detection information is no longer available at the time the volume processing operation is undertaken. For example, if the volume manipulation occurs at the output to the store (see unit 4 of FIG. 1) the processor does not have access to the information necessary to make the correct adaptive decision.

The arrangement now described allows movement information to be carried with other picture information so that adaptive volume manipulation can be effected at a point other than the input to a store. Basically, additional storage capacity in the main video store carries this information.

The store described in the basic system makes reference to a store capable of storing one complete frame of video information at a resolution of Q bits wide. In an earlier example Q is given the number 12 bits. In a practical system video data 8 bits wide is used at the input which allows reproduction of television video signals without perceptible degradation. The video store used for computation has been found in practice to operate satisfactorily with a width of 10 bits. The additional capacity between 8 bits at the input and 10 bits in the store is used to eliminate mathematical errors and to accommodate noise reduction processing described elsewhere.

As described above, the movement detector receives the incoming video signal and this is compared with the previously stored video signal and when a threshold level is exceeded a decision is made that movement has taken place. All effects which give rise to the threshold level being exceeded are ascribed to movement although they may come from other sources such as noise.

When the threshold level is exceeded an additional information bit (movement code) is stored in the video together with the video signal. The store thus carries processed video information plus an additional coding bit which identifies that movement has taken place. Movement detectors are also described in British patent application No. 31357/77.

The system output makes use of the coded video information to determine the adaptive control function to be applied in an adaptive volume processor.

Figure 12:
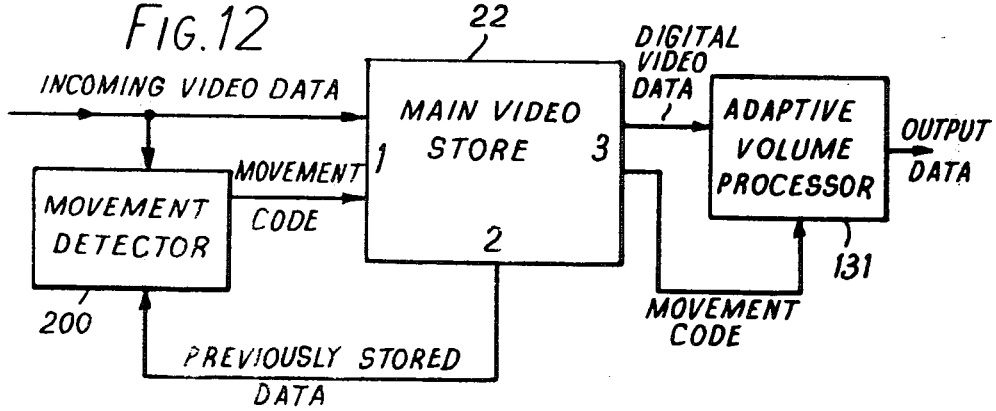
FIG. 12 shows an arrangement for inserting the generated movement code into picture data to allow the code to be used in the adaptive volume processor.

Thus, in context with the original basic system description one bit of the 12 bit wide video store is allocated to movement coding. FIG. 12 shows one data format which may be used. The most significant 10 bits of information are ascribed to the signal whilst one of the spare bits (bit 12) is ascribed to movement coding.

This allows the system to carry movement information across the main video store for utilisation by other circuits which would not otherwise have access to the movement information.

In the description above a single bit has been ascribed to the task of identifying movement. It is however clearly possible that various types of movement may be coded by utilising more than one bit. For example, two bits may be allocated (i.e. bits 11 and 12) which provide a total of 4 movement categories. Such categories could be classified as no movement-small movement-large movement-noise. Threshold levels would be selected accordingly.

Figure 11:
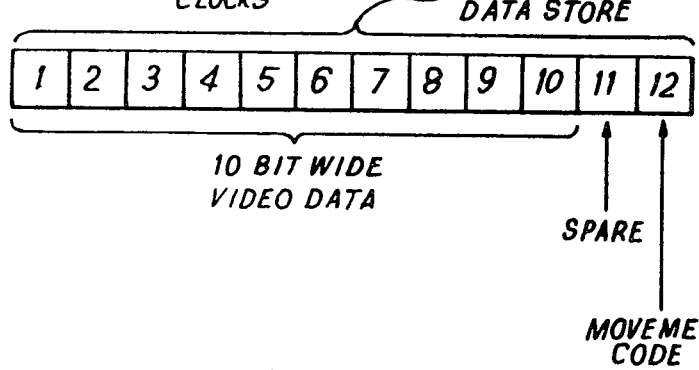
FIG. 11 shows a 12 bit data format including one bit for a movement code.

FIG. 12 shows a block diagram of the relevant parts of the system incorporating the video store together with an adaptive volume processor at the store output. Incoming video data is applied to input of the main video store 22 and to the movement detector 200. The movement detector has a further input from the main video store which enables the detector to determine whether movement has taken place between successive pictures. The output from the movement detector (movement code) is a single bit of information (for example) which is stored in parallel with the video input data passed to the store utilising the format shown in FIG. 11.

The main video store output provides digital data to the adaptive volume processor 131. An additional input to the adaptive volume processor is the movement code which is extracted from each word coming from the main video store. Depending upon the movement code stored at the input a change in movement code at the output provides adaptive manipulation within the volume processor. As previously stated, the main video store input and output system may be entirely asynchronous.

Although the input or output processing picture point synthesis has been described generally in relation to compression or expansion of the picture, the basic processing function (area or volume) can be used also for generating a new picture point from surrounding picture point information so that the same number of picture points are present at input and output. This allows synthesis of a picture point to be provided from surrounding information which is useful for noise reduction purposes as the random nature of noise tends to be averaged out by this synthesising step as described in more detail in British patent application No. 36839/78.

Although the example of the system described has related mainly to hardware for achieving the processing functions, it is possible to use an integrated store and processing system using microprocessor and computer technology to effect manipulation of picture information and generation of the required coefficients as described in detail in British patent application No. 42751/76 (U.S. application Ser. No. 841,519).

We claim:

1. A video system for manipulating picture information in the form of a plurality of picture points comprising adaptive processing means for receiving a number of picture points from more than one field to provide a synthesised picture point from information on a number of existing picture points adjacent said synthesised picture point and from more than one field; and
   selector means for determining the portions of information used from the picture points from each field in dependence on picture movement therebetween.

2. A system according to claim 1, wherein the processing means includes an area processor for receiving a number of picture points from adjacent lines horizontally and adjacent points vertically to provide a new picture point which corresponds to the sum of portions of the picture points within the selected area.

3. A system according to claim 2, wherein the processor comprises a plurality of multipliers each capable of receiving information on one picture point and an adder for summing the output from said multiplier.

4. A system according to claim 3, wherein the multipliers each comprise a random access memory having a plurality of locations for storing coefficients to be applied to these picture points.

5. A system according to claim 4, wherein coefficient storage means are provided for storing a plurality of predetermined coefficients for the random access memory to allow the coefficients applied to said picture points to be varied.

6. A system according to claim 3, wherein the multipliers are preceeded by line stores for receiving write and read signals at different rates to effect horizontal picture modification.

7. A system according to claim 1, wherein the processing means includes a volume processor for receiving a number of picture points from more than one field to provide a new picture point which corresponds to the sum of portions of the picture points selected.

8. A system according to claim 7, wherein the volume processor is adapted to receive a number of picture points forming a small picture area from more than one field.

9. A system according to claim 7, wherein the volume processor is adapted to receive a number of picture points from one line of one field and a number of picture points from two lines of another field to effect the picture point synthesis.

10. A system according to claim 7, wherein the volume processor is adapted to synthesise picture points from information contained in previous and current fields of both odd and even field types using interpolation during stationary scenes and from only an odd or only an even field type during parts of the scene which contain movement.

11. A system according to claim 7, wherein said selector means includes a movement detector provided to detect any picture movement.

12. A system according to claim 11, wherein video storage means are provided for storing at least one picture field for access by said movement detector.

13. A system according to claim 12, wherein said movement detector is adapted to provide a movement code indicative that picture movement has occurred, for storage with video data within the video storage means.

14. A system according to claim 13, wherein the volume processor is provided after the video storage means to modify the picture after storage in dependence on the movement code accompanying the video data.

15. A system according to claim 7, wherein video storage means are provided for storing at least one picture field for access by said volume processor.

16. A system according to claim 15, wherein the volume processor is provided prior to the video storage means to modify the picture prior to storage.

17. A system according to claim 1 including control means for controlling the synthesis of new picture points to provide at least a portion of picture comprising a plurality of new picture points, the number of picture points in said portion being different to the number of picture points contained in a corresponding portion of the existing picture.

18. A method of manipulating picture information in the form of a plurality of picture points comprising synthesising a new picture point from information on a number of existing picture points adjacent the synthesised point from more than one field, and selecting the portions of information used from the picture points from each field in dependence on picture movement therebetween.

19. A method according to claim 18 including receiving a number of picture points from adjacent lines horizontally and adjacent points vertically to provide a new picture point which corresponds to the sum of a portion of each picture point within the area.

20. A method according to claim 19 including forming at least a portion of picture comprising a plurality of picture points each synthesised from a number of existing picture points within a small area, the areas being selected so as to overlap one another.

21. A method according to claim 18 including synthesising the picture points from information contained in previous and current fields of both odd and even types using interpolation during stationary scenes and from only an odd or an even field during parts of the scene which contain movement.

22. A method according to claim 18, including detecting any movement occurring between the selected frames to control the picture point synthesis.

23. A method according to claim 18 including receiving a number of picture points from one line of one field and a number of picture points from two lines of another field to effect the picture point synthesis.

24. A method according to claim 18 including storing picture information from at least one field for use in the picture point synthesis.

25. A method as claimed in claim 24 including generating a code indicative of movement between fields, storing the code with the picture information, and reading out the stored code to control the portion of the picture point information used for the new picture point synthesis.

26. A method according to claim 18 including synthesising the new picture point by multiplying each existing picture point selected by a coefficient and summing the result.

27. A method according to claim 26 including storing a plurality of coefficients and selecting the required coefficient to be used in the multiplying step.

* * * * *